March 2, 1954
R. H. CURTIS
2,670,851
DISPOSABLE LIQUID FILTER ELEMENT
Filed June 7, 1949
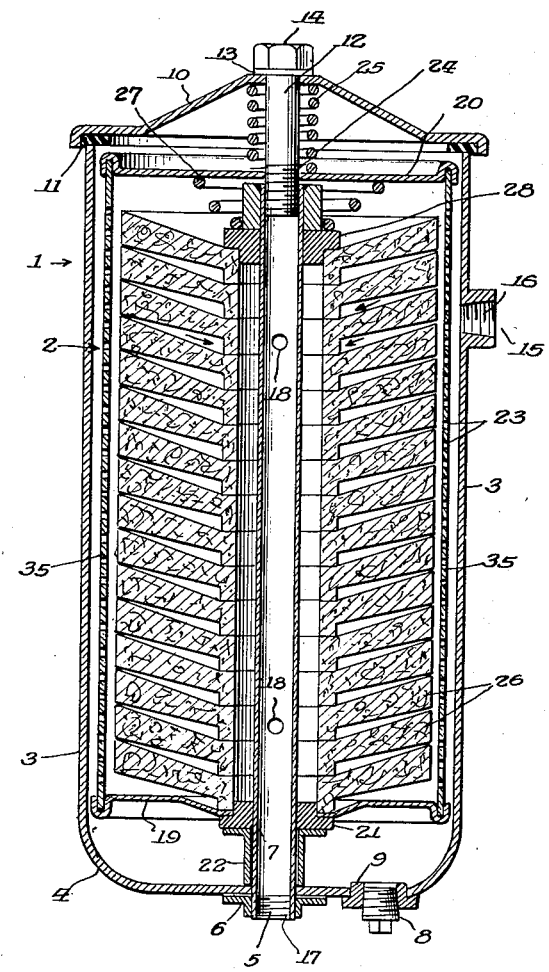
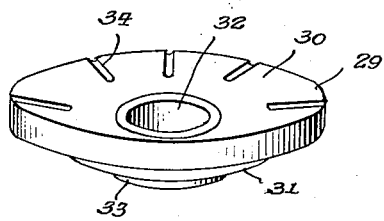
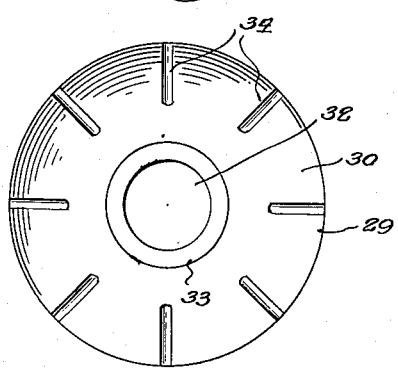
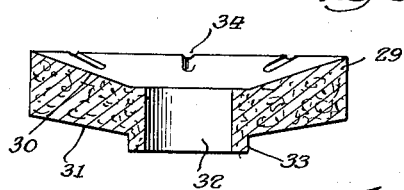
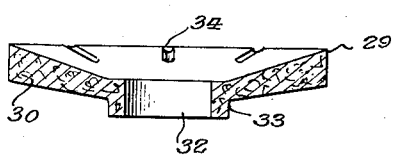
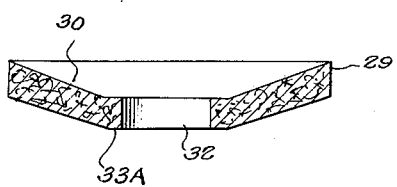
Inventor
Russell H Curtis
By: Spencer, Mazgall, Johnston & Cook
Attys Patented Mar. 2, 1954

2,670,851

UNITED STATES PATENT OFFICE 2,670,851

DISPOSABLE LIQUID FILTER ELEMENT

Russell H. Curtis, St. Charles, Ill., assignor to Hawley Products Company, St. Charles, Ill., a corporation of Delaware Application June 7, 1949, Serial No. 97,614

6 Claims. (Cl. 210—120)

This invention relates to disposable filter elements and particularly to filter elements of molded fibrous material for use in liquid systems.

It is an object of the present invention to provide a new and useful, inexpensive, easily replaceable filter element for use in liquid systems.

Another object of the present invention is to provide a one-piece molded fibrous filter element adapted to be used in conventional oil filter cartridges.

Another object is to provide a porous filter element which may be readily prepared from an aqueous dispersion of fibrous material.

A further object of this invention is to provide a unitary molded fibrous filter element which may be adapted for use in any size filter unit.

A still further object is to provide a molded fibrous filter element having an extensive surface area in contact with the fluid to be filtered.

Another object is to provide an oil filter unit from which contaminated filter packing may be removed and easily replaced.

The above objects and other objects and advantages of the invention will become apparent upon further examination of the following description and the accompanying drawings.

The present invention is directed to the preparation of molded fibrous cone-shaped elements of any desired thickness. The elements are adapted to be used alone or together with a number of other elements such that any desirable thickness of filter material may be achieved. The elements may be rapidly and inexpensively molded from aqueous dispersions of suitable fibrous materials in such form that they will provide a large surface area in contact with the contaminated fluid.

In the accompanying drawings and description one embodiment of the invention will be described, but it will be understood that some variations may be made without departing from the invention.

In the drawings:

Fig. 1 is a vertical sectional view of an oil filter showing one embodiment of the present invention;

Fig. 2 is a perspective view of one type of molded fibrous element to which the invention is directed;

Fig. 3 is a top plan view of the molded fibrous element shown in Fig. 2;

Fig. 4 is a vertical cross-sectional view of the molded fibrous element shown in Figs. 2 and 3;

Fig. 5 illustrates an alternative form of filter element; and

Fig. 6 is a sectional view of another form of the filter element.

Considering the drawings now in greater detail, in Fig. 1 there is illustrated a housing 1 and a removable cartridge 2 therein. The housing consists of a generally cylindrical casing 3 having a bottom 4 with a central opening 5. A collar 6 surrounds the opening 5 and positions the center tube 7. The center tube 7 extends upwardly through the central axis of the housing 1. A drain plug 8 is also provided in the bottom wall entering a suitably threaded flanged collar 9 fixed therein. The upper edge of the cylindrical casing 3 is closed by a cover 10 with a washer 11 positioned between the two to obtain a tight fit. A bolt 12 is threaded into the upper end of the center tube 7 to hold the cover in position while a sealing washer 13 is positioned below the head 14 of the bolt on the outer surface of the cover around the opening through which the bolt extends. The sidewall 3 also has an entrance opening 15 threaded as at 16 to receive the incoming oil line (not shown) by which fluid is introduced into the body of the filter. Filtered liquid enters the center tube 7 through the plurality of openings 18 therein. Discharge occurs through the center tube 7 which has the threaded end 17 to which an outlet conduit is attached.

The cartridge 2 consists of a cylindrical perforated wall 35, having a bottom 19 and a top 20 rolled and tightly sealed into engagement with the sidewall. The bottom is fitted with a resilient grommet 21 which fits tightly about the center tube 7, providing a liquid seal and rests upon a supporting ring 22. Liquid passing from the inlet 15 to the tube 7 must pass through a plurality of openings 23 in the sidewall 35 of the cartridge.

The top of the cartridge is provided with an opening 24 which receives the bolt 12 and with a spring 25 between the underside of the cover and the top 20 of the cartridge which presses the cartridge toward the support 22.

As the liquid to be filtered passes through the cartridge, a stack of filter members 26 removes contaminant therefrom. The stack of filter members 26 rests upon the bottom 19 and the individual members of the stack are pressed into engagement with each other by means of a spring 27 coiled between the underside of the top 20 of the cartridge and an annular ring 28 which presses on the stack. Increasing the compression of the spring results in compressing the fibers about the center opening, thereby increasing the density of the fibers.

The fibrous filter elements 26, as shown in position in the cartridge in Fig. 1 and in detail in Figs. 2, 3, 4 and 5 are each composed of an outer edge 29, a conical inner side 30, a conical outer side 31, an opening in the center 32, and an annular supporting shoulder 33, immediately surrounding the opening. The element illustrated may be of any desired thickness depending upon the liquid to be filtered and the general shape of the filter casing. The shallow grooves 34 are optionally formed in the inner conical face of the element to increase the filtering surface.

The elements illustrated in Figs. 4 and 5 represent two forms of the invention in which one element is thicker than the other. Each of these elements is thicker but less dense at the periphery while being thinner and more dense near the center. The less dense or less compressed area near the periphery removes larger contaminant particles while the more dense or highly compressed area removes very fine particles. The shoulder 33 surrounds the annular center opening in the molded element and is integrally associated with the cone portion of the element. The shoulder provides a solid base for supporting adjacent members when a plurality of elements are assembled into a built-up or stacked filter unit.

In Fig. 6 the filter element is shown in a simple form in which the shoulder 33 is eliminated in favor of a small annular ring 33A about the opening, of the same thickness as the remainder of the element.

In its preferred use the molded fibrous filter element is combined with any desired number of like elements and is placed in the filter cartridge in such manner that the foraminous member is effectively isolated from the body of the filter casing. Then in order for liquid to be discharged from the low pressure side of the filter unit it must pass through the filter elements. In so doing, the liquid is passed through and between the filter elements thus presenting a large surface area upon which any solid material will be deposited. After it has been determined that the life of the filter element has been exhausted, or if the time for change has arrived, the elements may be very simply replaced by removing the cover member 10 from the casing and withdrawing the cartridge 2.

It is contemplated that the elements may be prepared in any suitable way so long as they are made of fibrous material. One method which may be successfully employed, particularly for the preparation of elements which are of moderate thickness, is the waterlaying method by which the fibers are deposited from an aqueous dispersion of fibrous material onto a perforated screen or mold. Elements of considerable varying thickness may be made in this same manner. For the thicker elements, a process of pressure felting has been found to be useful. In this process a tube is filled with a predetermined amount of an aqueous dispersion of fibrous material and a foraminous piston in fluid tight engagement with the tube forces the water from the dispersion through a former screen or through the piston. The result is an element of molded fibers which may be of a substantial thickness and density.

The waterlaying or pressure felting processes outlined herein make possible the preparation of elements of a thickness and density which have unusual properties as filtering elements. The density of an element can be varied at will. For example, in the elements of Figs. 4 and 5 the fibers near the center can be compacted to considerable density while the fibers near the periphery may be less dense. Hence, as previously indicated, large particles will be trapped near the periphery while smaller particles will be retained in the denser portion.

The molded fibrous filter elements may be made of a wide variety of fibers, such as vegetable, mineral, or animal fibers or any combination of these materials. Cellulosic materials which have been employed include cotton linters, kraft pulp, and other wood pulps. Wool, fiber glass, asbestos fibers and synthetic or artificial fibers may be used, it being essential only that the fibrous material used be capable of being made into porous forms with sufficient interstices between the fibers.

A filter element prepared in the manner just described can be more successfully employed in the presence of water if a subsequent treatment has been given the molded element to impart to it a certain wet-strength. Since most liquids, including oils, carry at least a small portion of water as a contaminant, it may be desirable to treat the molded element with a composition capable of imparting wet-strength to the fibers regardless of whether it is to be used for filtering oily or aqueous liquids.

Wet-strength resins are well known in the paper pulp art and include a variety of chemical compositions. The better known wet-strength resins include a melamine-formaldehyde type of resin and a so-called one-stage phenolic resin of the phenol-formaldehyde type. The phenolic resins have the advantage of slightly improved water resistance and strength over the melamine resins. The wet-strength resins are to be distinguished from the coating resins in that the wet-strength resin will deposit upon the fibers in such manner as not to clog the area between fibers while the coating type resins tend to clog or seal the area between fibers. Thus, it will be seen that the wet-strength resin may be employed in a filter element, while the coating resin would be unsuited for this purpose.

In the present invention it is contemplated that any suitable methods of application of the wet-strength resin may be used. The earlier known methods involve a dipping process in which the molded fibrous article is immersed in the resin for a time sufficient to allow a coating of the resin to form on the fibers. A further development allows the introduction of the wet-strength resin into the beater where it is thoroughly mixed with the beaten fibers. Further treatment of the beaten dispersion of resin and fiber results in the deposition of a film of resin on the individual fibers. This resin impregnated fiber may be satisfactorily molded into the finished product with the elimination of the subsequent dipping step.

The thickness and compactness of the filter element are important features of the invention. The element should be of sufficient thickness and compactness to be self-sustaining in shape and to resist distortion due to filtration pressures. It should be essentially non-flexible at the center portion, but it may be slightly flexible at the outer edge. The self-sustaining quality of the element should be such as will resist lateral compression applied from the edges. At the same time the element is preferably resilient to vertical compression applied to the upper and lower sides.

As an example, a filter element having the previously recited properties was made by molding fibrous material by a pressure felting method into a cone-shaped element 5¼ inches in diameter with a ¾ inch hole in the center. The cone measured one inch from the base to the apex and 1/16 inch in thickness. It will be apparent that the thickness, diameter, size of hole, and shape of the cone may be altered at will to achieve any desired result or design of filter without going beyond the spirit of the present invention. If the thinner type element is used it will be understood that the larger number of such elements required to make a built-up filter unit will provide a relatively larger surface area. On the other hand, thick elements will provide a smaller surface area and require more of the liquid to pass through the body of the element.

While the disposable filter element has been previously described as a cone-shaped article, the invention contemplates the employment of any design in which the center portion is in a different plane from the peripheral portion of the filter element. The peripheral portion may be round, in which case a conical body is formed, or it may be square, rectangular, or elliptical. If square or rectangular a pyramidal body is formed, and if elliptical an ellipsoidal body is formed. In any of the previously recited forms a surface area of relatively large proportions is achieved. At the same time, a filter element made in one of the above forms has a rigid shape which resists distortion from filtration pressures.

The individual molded fibrous elements are particularly well adapted for use in a filter unit in which spent elements are removed from about the foraminous tubular member and are replaced by placing clean elements around the foraminous tube. In other instances it may be advantageous to make up a filter unit by inserting a foraminous tubular member such as a circular screen into the center opening of a suitable number of the molded filter elements. Then when the unit is spent the entire unit, including the foraminous member is replaced with a similar clean unit.

From the foregoing description of the invention and the drawings, it will be seen that a filter element having a number of advantages and novel characteristics has been provided by the preparation of a one-piece molded fibrous article. The principal advantages of the present invention include the preparation of an inexpensive filter element which may be readily changed and disposed of, and which may be used alone or in combination with other like filter elements in any desired number to provide an extensive surface area in contact with the contaminated fluid to be filtered. The nestable feature of the individual filter elements is important because it allows the use of any number of elements of any particular thickness or shape in built-up relation to make a filter unit of any desirable characteristics.

The invention is hereby claimed as follows:

1. A concavo-convex filter element of porous integral molded fibrous material which comprises an apical portion having an opening therethrough, a peripheral portion in a plane different from that of said apical portion, sloping sides integrally connecting said apical portion and said peripheral portion, and a substantially plane annular portion enclosing said opening and integrally connected with said apical portion, said element being characterized by decreasing density of fibrous material from the apical portion to the peripheral portion.

2. A concavo-convex filter element of porous integral molded fibrous material which comprises an apical portion having an opening therethrough, a peripheral portion in a plane different from that of said apical portion, sloping sides integrally connecting said apical portion and said peripheral portion, and a plurality of grooves in the face of said sides and extending from the periphery of said filter element to points intermediate said periphery and said opening, said sides being characterized by increasing thickness but decreasing density of fibrous material from the apical portion to the peripheral portion.

3. A replaceable concavo-convex filter element of porous integral molded fibrous material which comprises an apical portion having an annular opening through the center thereof, an annular peripheral portion in a plane different from that of said apical portion, sloping sides integrally connecting said apical portion and said peripheral portion, a substantially plane annular shoulder portion enclosing said annular opening on one side of said apical portion and integrally connected therewith, and a plurality of grooves in the face of a side opposite said shoulder and extending from the periphery of said filter element to points intermediate said periphery and said opening.

4. A concavo-convex filter element of porous integral molded fibrous material which comprises an apical portion having an annular opening therethrough, a peripheral portion in a plane different from that of said apical portion, sloping sides integrally connecting said apical portion and said peripheral portion, a substantially plane annular shoulder portion enclosing said annular opening and integrally connected with said apical portion, said peripheral portion being of substantially the same thickness as said apical portion adjacent said opening, and a plurality of grooves in the face of said sides and extending from the periphery of said filter element to points intermediate said periphery and said opening, said element being characterized by decreasing density of molded fibrous material from the apical portion to the periphery thereof.

5. A concavo-convex filter element of porous integral molded fibrous material which comprises an apical portion having an annular opening therethrough, a peripheral portion in a plane different from that of said apical portion, sloping sides integrally connecting said apical portion and said peripheral portion, an annular shoulder portion enclosing said annular opening and integrally connected with said apical portion, and a plurality of radially extending grooves in the face of said sides and extending from the periphery of said filter element to points intermediate said periphery and said opening, said sides being characterized by increasing thickness but decreasing density of fibrous material from the apical portion to the peripheral portion.

6. A filter comprising a casing having inlet and outlet openings therein, a foraminous tubular member associated with one of said openings, a plurality of porous concavo-convex filter elements of integral molded fibrous material adapted to completely enclose said foraminous member and to isolate it from the other of said openings, said elements comprising an apical portion having an opening therethrough, a peripheral portion in a plane different from that of said apical portion, and sloping sides integrally connecting said apical portion and said peripheral portion, said elements being characterized by decreasing density of fibrous material from the apical portion to the peripheral portion.

RUSSELL H. CURTIS.

References Cited in the file of this patent

UNITED STATES PATENTS

| Number | Name | Date |
|---|---|---|
| 428,307 | Leland | May 20, 1890 |
| 740,367 | Knight | Sept. 29, 1903 |
| 1,804,512 | Pickard | May 12, 1931 |
| 2,137,556 | Young | Nov. 22, 1938 |
| 2,147,792 | Knight | Feb. 21, 1939 |
| 2,250,871 | Lumbert | July 29, 1941 |
| 2,298,980 | Sloan et al. | Oct. 13, 1942 |
| 2,321,574 | Chaplin | June 15, 1943 |
| 2,359,475 | Gauthier | Oct. 3, 1944 |
| 2,460,129 | Ista | Jan. 25, 1949 |
| 2,569,413 | Giauque | Sept. 25, 1951 |
| 2,582,272 | Pamp | Jan. 15, 1952 |

FOREIGN PATENTS

| Number | Country | Date |
|---|---|---|
| 122,627 | Great Britain | May 8, 1919 |